United States Patent
Brombach et al.

(10) Patent No.: US 11,411,405 B2
(45) Date of Patent: Aug. 9, 2022

(54) METHOD OF FEEDING ELECTRIC POWER BY MEANS OF A WIND ENERGY SYSTEM

(71) Applicant: Wobben Properties GmbH, Aurich (DE)

(72) Inventors: Johannes Brombach, Berlin (DE); Ingo Mackensen, Aurich (DE); Stefan Gertjegerdes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/183,143

(22) Filed: Feb. 23, 2021

(65) Prior Publication Data

US 2021/0265841 A1 Aug. 26, 2021

(30) Foreign Application Priority Data

Feb. 25, 2020 (DE) .......................... 102020104932.3

(51) Int. Cl.
*H02J 1/00* (2006.01)
*H02J 3/00* (2006.01)
*H02J 3/38* (2006.01)
*F03D 9/11* (2016.01)
*F03D 7/02* (2006.01)
(Continued)

(52) U.S. Cl.
CPC ............ *H02J 3/381* (2013.01); *F03D 7/0284* (2013.01); *F03D 9/11* (2016.05); *H02J 3/0012* (2020.01); *H02J 3/32* (2013.01); *H02J 3/48* (2013.01); *H02J 3/50* (2013.01); *F05B 2260/42* (2013.01); *F05B 2270/1033* (2013.01); *H02J 2300/28* (2020.01)

(58) Field of Classification Search
CPC .. H02J 3/381; H02J 3/0012; H02J 3/32; H02J 3/48; H02J 3/50; H02J 2300/28; H02J 3/16; H02J 3/18; H02J 3/38; H02J 3/001; F03D 7/0284; F03D 9/11; F05B 2260/42; F05B 2270/1033; Y02E 10/72; Y02E 10/76; Y02E 40/30; Y02E 70/30
USPC .......................................................... 307/84
See application file for complete search history.

(56) References Cited

U.S. PATENT DOCUMENTS

| | | | |
|---|---|---|---|
| 7,741,728 B2 | 6/2010 | Fortmann et al. | |
| 2019/0093634 A1 | 3/2019 | Biris et al. | |

(Continued)

FOREIGN PATENT DOCUMENTS

| | | |
|---|---|---|
| DE | 10344392 A1 | 6/2005 |
| EP | 2696070 A1 | 2/2014 |

*Primary Examiner* — Richard Tan
(74) *Attorney, Agent, or Firm* — Seed IP Law Group LLP

(57) ABSTRACT

Provided is a method of feeding electric power at a grid connection point into an electric power grid having a grid voltage using a converter-controlled feeder, in particular using a wind energy system and/or of a storage unit. The method includes feeding the electric power into the electric power grid in a normal operating mode when no grid fault or grid malfunction has been detected in the electric power grid, and switching to a fault mode when a grid fault or grid malfunction has been detected, in which the grid voltage is increased or decreased. In the normal operating mode an active current is fed in in order to feed active electric power into the grid and if the need arises a reactive electric power is additionally fed into the grid by a reactive current. The combination of the active and reactive currents results in an apparent current.

18 Claims, 5 Drawing Sheets

(51) Int. Cl.
    *H02J 3/32* (2006.01)
    *H02J 3/48* (2006.01)
    *H02J 3/50* (2006.01)

(56) References Cited

U.S. PATENT DOCUMENTS

2019/0195198 A1* 6/2019 Andersen .............. F03D 7/0272
2020/0409404 A1* 12/2020 Knobloch ................ H02J 3/46

* cited by examiner

METHOD OF FEEDING ELECTRIC POWER BY MEANS OF A WIND ENERGY SYSTEM

BACKGROUND

Technical Field

The present invention relates to a method of feeding electric power into an electric power grid. The present invention also relates to a wind energy system for performing such a method. The invention also relates to a storage unit for performing such a method and to a converter-controlled feeder for performing such a method.

Description of the Related Art

Wind turbines are known from the prior art and feed electric power into an electric power grid. This can be done by a single wind turbine or by a wind farm in which a plurality of wind turbines are combined and feed power into the electric power grid via the same grid connection point. A wind turbine or a wind farm comprising a plurality of wind turbines is referred to here under the generic term "wind energy system". Such a wind energy system can also have an electric storage unit from which power is also fed into the electric power grid.

This power infeed is carried out using a frequency inverter or converter. For that reason, such wind turbines or wind farms, as well as electric storage units that feed power into the electric power grid by means of a converter are referred to as converter-controlled feeders. A photovoltaic system may also function as a converter-controlled feeder.

Nowadays, such converter-controlled feeders, in particular wind energy systems, have an increasing share in supplying electric power in an electric power grid, at least in some electric power grids. Such converter-controlled feeders are not only suppliers of energy and power, therefore, but are also used to support the electric power grid and in most cases play an increasingly important role in that regard.

Such converter-controlled feeders, especially present-day wind turbines and thus present-day wind farms also, must have characteristics that allow advanced control of any grid fault. These characteristics are also referred to as FRT (fault ride-through) characteristics.

FRT characteristics of present-day wind turbines are well known and established. In the event of a voltage drop in the electric power grid, an additional voltage-supporting reactive current is fed in, in particular by means of a parameterisable droop control. Two basic modes are known in this regard, namely a mode 1 and a mode 2, which may also be referred to as QU(2) mode and QU(UK) mode, respectively.

In response to a fault, the power is increased in both modes up to the apparent current limit of the converter. If that limit is reached, either a prioritized reactive current is fed in, namely in mode 1, or a prioritized active current is fed in, namely in mode 2.

Setting a reactive current priority, i.e., mode 1, for variable-voltage grids in order to output, i.e., to feed in, the full reactive current is known from the prior art. This means that feeding in the reactive current has priority over feeding in active current, and if the reactive current is to be increased further, the active current is to be reduced, even to zero if necessary. In other words, the active current is reduced so that the reactive current can still be increased while keeping within a predefined maximum apparent current. This is based on the known relationship between apparent power S, active power P and reactive power Q as expressed in the following equation:

$$S^2 = P^2 + Q^2$$

The same relationship also applies, of course, to the apparent current, on the one hand, and to the active current and reactive current, or active current component and reactive current component, on the other. Due to the quadratic relationship, i.e., the addition of squares, a reduction in the active components may result in only a relatively small increase in the reactive component, depending on the operating point. In particular, if the active component is already small, a further reduction will only result in a minimal increase in the reactive component.

In variable-frequency grids, a drop in voltage can thus cause a grid frequency problem due to the prioritization of reactive current. In this case, a drop in voltage would also lead to the reactive current priority possibly causing a reduction in the active current and thus a reduction in the fed-in active power to as low as zero, occasionally. A reduction in the fed-in active power can result in a decrease in frequency, however, which can thus lead in variable-frequency grids to such a strong reduction in frequency that a frequency problem arises.

If active current is prioritized, i.e., in accordance with method 2, priority is assigned to feeding in active current, and the reactive component must be reduced, if necessary, or may not be increased, with the possible consequence that no reactive power at all is fed in, if the active current can be increased as a result. Although the aforementioned frequency problem cannot occur immediately as a result, the prioritization of active current may result in no voltage support at all being provided in the event of a drop in voltage, or even in a reduction in the reactive power that was already being fed in before the fault arose. In this second mode, the wind turbine will therefore continue to feed in its entire active power, in the event of a drop in voltage, by producing a higher current up to the current limit of the converter. There is therefore a risk of voltage collapse as a result.

BRIEF SUMMARY

As described herein, in fault mode operation, good grid support is provided that avoids not only the aforementioned problem with frequency, but also the aforementioned problem of potential voltage collapse.

A method of feeding electric power is thus proposed. The power infeed is performed at a grid connection point, where power is fed into an electric power grid. This electric power grid has a grid voltage. The grid voltage can be measured at the grid connection point, for example. Power is fed in by means of a converter-controlled feeder. To feed in power, such a feeder therefore has converters or inverters which can thus produce an electric current having a specific magnitude, frequency and phase.

Such converter-controlled feeders can be configured, in particular, as wind energy systems and also, or alternatively, as storage systems. A wind farm or a single wind turbine may therefore be provided, both of which are to understood under the concept of wind energy system. Converter-controlled infeed, i.e., the feeding of power by means of a converter, can also mean, in particular, that a plurality of converters are used, in particular a plurality of converters connected in parallel.

The method proposes feeding electric power into the electric power grid in a normal operating mode when no grid fault or grid malfunction has been detected in the electric power grid. The method monitors the electric power grid accordingly for grid faults or grid malfunctions. The following descriptions of grid faults apply analogously to grid malfunctions, even if these are not explicitly mentioned. Monitoring can be carried out by measuring and/or by analyzing externally obtained signals, for example by analyzing signals transmitted by an operator of the electric power grid. Such monitoring of the electric power grid for a grid fault can preferably also be carried out by analyzing the behavior of the converter-controlled feeder. Such a converter-controlled feeder generally responds to any change in the electric power grid, and such responses, some of which will also be described below, allow conclusions to be drawn about the electric power grid or about any faults that occur in it.

It is also possible that there is a grid fault in the electric power grid, but one that is insignificant or can be disregarded for other reasons, for example because it is too far away. In that respect, the important aspect when feeding in power in normal operation is that no grid fault has been detected.

It is also proposed that operation is switched to fault mode operation when a grid fault or a grid malfunction has been detected. Such a switchover to fault mode operation is proposed whenever there is a grid fault or malfunction of the kind where the grid voltage decreases or increases. The system monitors for any drop in voltage or surge in voltage, in particular. A drop in voltage is a decrease in grid voltage such that it drops below a predetermined lower limit for the grid voltage. When a surge in voltage occurs, the grid voltage rises above an upper voltage limit.

Monitoring for overvoltage makes particular sense in the mode in which reactive current is prioritized. It has been found that, although the active current decreases proportionally with voltage during an over-voltage ride-through (OVRT), if a fixed active power can be maintained, the reactive current can nevertheless increase to such a high level that it may be necessary to limit or reduce the active current and thus the active power. This is particularly the case when large gains or gain factors are used between a voltage deviation and the reactive power to be fed in. These factors are also referred to as k-factors. In such cases, a reactive current can nevertheless occur that is so high that it is necessary to reduce the active current and thus the active power. In this regard also, it is proposed that the active current not be reduced to zero. Undervoltages or voltage drops can also result in a greater amount of reactive current being provided in order to raise the voltage. However, the reactive current differs in its phase position from the case where its intended effect is to reduce the voltage. In simple terms, that phase position is negative by comparison and is also referred to as "absorption". The problem nevertheless arises that a maximum apparent current may be exceeded.

It is proposed that an active current be fed into the grid in normal operation in order to feed active electric power into the grid, and that a reactive electric power be additionally fed into the grid by a reactive current if the need arises. The active current and the reactive current together result in an apparent current, in particular in accordance with the well-known relationship expressed in the equation $I^2_S = I^2_P + I^2_Q$. In this equation, $I_S$, $I_P$ and $I_Q$ are the apparent current, the active current and the reactive current, respectively.

A reactive current can be fed in as voltage support, i.e., to increase the grid voltage, or also, in the opposite direction, to reduce the grid voltage. Another potential option, however, is that no reactive current is fed in, initially at least.

For fault mode operation, it is proposed that additional reactive current be fed in, namely with the appropriate phase position, in order to raise or lower the grid voltage. In somewhat simplified terms, this can also be expressed as feeding in with a different sign. Such an infeed to raise the grid voltage is also referred to as "generation", and an infeed to lower the grid voltage is also referred to as "absorption". By feeding in additional reactive current, the reactive current is thus increased in magnitude.

A distinction is made here between two different modes. It is proposed that a mode prioritizing reactive power or a mode prioritizing active power is used, and that the mode prioritizing reactive power is characterized in that, when the need arises, the active current is reduced in such a way that the apparent current keeps within an apparent current limit, and the mode prioritizing active power is characterized in that the reactive current is limited or reduced, when the need arises, in such a way that the apparent current keeps within the apparent current limit. In order to keep within an apparent current limit, it may thus occur that, of the active current and reactive current of which the apparent current is composed, only one of the two can be increased at the expense of the other. In the mode prioritizing reactive power, the reactive current takes precedence, in other words it is then increased at the expense of the active current. The converse applies in the mode prioritizing active power, as the active current then takes precedence, with the result that the reactive current is then limited in amount or reduced.

In the mode prioritizing reactive power, the active current is reduced in such a way that the apparent current keeps within an apparent current limit. The underlying idea here is that increasing the amount of reactive current additionally fed in while simultaneously increasing or at least not reducing the active current would push the apparent current to its apparent current limit and also beyond that limit, until appropriate fuse contacts would respond and mechanically disconnect the power line, or semiconductor protection would switch off the semiconductors when the physical limits of the semiconductor are reached. That is undesirable, of course, and accordingly is controlled in such a way that this situation is avoided. To that end, the active current is reduced such that the apparent current keeps within that apparent current limit, i.e., does not exceed it.

Alternatively, the mode prioritizing active power is provided. In fault mode operation and in the variant represented by the mode which prioritizes active current, a reactive current is increased in order to raise the grid voltage, and the active current is then increased in order to maintain the active power that is currently required and/or to maintain the active power fed in hitherto, since at low voltage more current is needed to maintain the power level. However, another option is to increase the active current in the event of overvoltage, particularly when more power is required. If an apparent current limit is reached in the process, which may be of the same amount as the apparent current limit in the mode prioritizing reactive power, then reactive current is reduced in order to keep within the apparent current limit while the active current continues to increase. These two modes may both be present to that extent, namely the mode prioritizing reactive power, which requires prioritization of the reactive current, and a mode prioritizing active power, which requires prioritization of the active current.

It is proposed that, in the mode prioritizing reactive power, an upper reactive current limit be specified for the magnitude of the reactive current and also, or alternatively, that a lower active current limit be specified for the active current. This ensures that the reactive current is still prioritized in the mode prioritizing reactive power, i.e., that the active current can be reduced in order to allow even more reactive current to be fed in while keeping within the apparent current limit, but that limits are set so that the active current is prevented from dropping completely to zero.

More particularly, it has been found in this regard that, due to the aforementioned equation showing the relationship between apparent current, active current and reactive current, completely reducing the active current to zero, for example for the last 10% in relation to a nominal active current, or in relation to the apparent current limit, means that it is no longer possible to increase the reactive current. It has thus been found that, by setting this limit, it is possible to prevent the case where major damage is avoided by lowering the active current completely to zero, but which has no significant effect on the reactive current. This can also be achieved, of course, by specifying an appropriate limit value for the reactive current, in particular as an upper reactive current limit that may not be exceeded. A lower limit for the active current would be preferable, as the measurement accuracy can then be higher, or adjustment can be more accurate.

For the mode prioritizing active power, it is proposed, accordingly, that an upper active current limit be specified for the active power and/or that a magnitude for a lower reactive current limit be specified for the reactive current. Thus, in the mode prioritizing active power, a controller prioritizing active current may be provided, which can also be referred to as an operation mode prioritizing active current, but in which a complete reduction of the reactive power to zero is avoided. Since the reactive current can perform voltage support not only by positive infeed (generation) but also by positive withdrawal of reactive current from the electric power grid (absorption), it is proposed that a magnitude be specified for the lower reactive current limit.

According to one embodiment, it is proposed that, in fault mode operation, switching occurs from the mode prioritizing reactive power to the mode prioritizing active power, or vice versa. This depends, of course, on the operating mode prior to switchover. It is proposed, in particular, that when a predefined first current limit, in particular an apparent current limit, is reached, the upper reactive current limit or the lower active current limit is switched from the mode prioritizing reactive power to the mode prioritizing active power, or, when a predefined second current limit, in particular the apparent current limit, is reached, the upper active current limit or the lower reactive current limit is switched from the mode prioritizing active power to the mode prioritizing reactive power. In addition to the specified current limits mentioned above, other limits may also be specified as a first and second current limit, e.g., a limit that is between 1 and 10% lower than the apparent current limit. In this way, the proposed switchover can be carried out in a timely manner.

Such a switchover is proposed, in particular, in a grid fault ride-through, such as an over-voltage ride-through (OVRT) or a low voltage ride-through (LVRT).

A situation can arise, in particular, in which the grid voltage at the grid connection point is already high, e.g., due wholly or partially to an active power infeed. In this situation, reactive power can already be fed in as a voltage-reducing measure, in particular with such a high amplitude that this reactive power infeed is close to a possible maximum. This can be the result of a control system that wants to ramp down the aforementioned high voltage.

In this case, there may also be a situation in which the converter-controlled feeder, in particular a wind farm, feeds in power in a mode that prioritizes active power. In that respect, such a mode prioritizing active power can also be set and applied in normal operation, and the same applies accordingly for the mode prioritizing reactive power.

If, as a fault mode, an overvoltage fault now occurs as a grid fault to be ridden through, the active power would remain the same, since it is specified. However, the active current would decrease somewhat in response, due to the increased grid voltage. The feeder would feed in a voltage-reducing reactive current, or would increase the amount of reactive current that is already being fed in to reduce the voltage.

If the feeder approaches the current limit, namely the apparent current limit, the reactive power or the reactive current cannot be increased any further.

It is now proposed, therefore, that the operating mode be switched from the mode prioritizing active power to the mode prioritizing reactive power. This is based on the realization that the feeder is liable to be disconnected from the electric power grid if the voltage becomes too high. If such a case arises, no power at all can be fed into the grid. In that case, switching from the mode prioritizing active power to the mode prioritizing reactive power thus allows more active power to be fed in than would be the case if the feeder remained in the mode prioritizing active power, which would have resulted in disconnection from the grid. No active power at all could then be fed in. By switching to the operating mode in which reactive power is prioritized, but in which specifying the lower active current limit and the upper reactive current limit ensures that at least some active power is fed in, it is possible that at least some active power is fed in.

In another situation, switching from a mode prioritizing reactive power to a mode prioritizing active power may also be advantageous if the mode prioritizing reactive power would result in the feeder being disconnected from the grid, whereas the mode prioritizing active power would have prevented that from happening. Such a switchover is proposed, especially, when the grid frequency falls below a predefinable switchover frequency. The switchover frequency is specified in a range below the nominal grid frequency, in particular in the range between 0.2 and 2% of the nominal grid frequency below the nominal grid frequency.

According to one embodiment, it is proposed that at least one of the current limits from the list comprising the upper reactive current limit, the lower active current limit, the upper active current limit and the lower reactive current limit can be changed dynamically.

The current limits prevent the reactive current or the active current, depending on prioritization, i.e., the respective non-prioritized current, from being completely reduced to zero. This ensures that the respective non-prioritized current can continue to have a supporting effect. Depending on the situation, however, the need for the non-prioritized current to have such a supporting effect, and the possibility of providing such a current may differ in amount. This may depend, in particular, on an operating point of the converter-controlled feeder. If, for example, the operating point has a relatively low apparent power, is composed, for example, of a low active current component and a low reactive current component, the non-prioritized current component will already have a low value, therefore, which would mean it cannot be reduced to a lower absolute value without this having impacts that are too negative.

More particularly, the respective current limit can be adjusted according to a grid characteristic identified as a characteristic of the electric power grid. Depending on the grid characteristic, the need for the remaining, non-prioritized current component to support the electric power grid may vary. The respective current limit can be adjusted accordingly. A grid rigidity as described further below can be considered such an identified grid characteristic. Grid sensitivity is another identified grid characteristic to consider monitoring, as is a short-circuit current ratio, both in relation to the grid connection point.

According to one embodiment, it is proposed that at least one of the current limits is not set or does not become effective until after a predetermined waiting period once the switchover to fault mode operation has been made. Such a waiting period is preferably in the range from 2 ms to 100 ms, in particular in the range from 5 ms to 50 ms. The delay in taking effect can also be achieved by not taking the relevant current limits into account until after the waiting period for the respective unit that is to implement it.

It has been found in this regard that, in the mode prioritizing reactive power, the reactive power or the reactive current is firstly set or regulated or controlled, after which the active power or the active current is controlled or regulated, in particular by a higher-level controller. It was therefore realized that it may make sense initially not to set a lower limit for the active power, or not to let it take effect yet, or not to take it into account yet, because the situation, in particular the conflicting priorities, has not yet arisen or is still of little relevance. The same applies to the upper reactive current limit, if this is specified, in order to avoid no active current at all being fed in. During that period, the reactive power or the reactive current can still be freely regulated.

This idea also applies accordingly to the mode that prioritizes active power. If, in this case, the active power or the active current is initially controlled, and the reactive power or the reactive current is not controlled or regulated until after that, in particular as superimposed control, it is possible to postpone until then the adjustment of the respective current limit, or its taking effect, i.e., to postpone the adjustment of the upper active current limit and/or the lower reactive current limit, or its taking effect. During that period, the active power or the active current can still be freely regulated.

Alternatively, the current limits can also be implemented as fixed limits. This ensures simple and stable implementation, in particular. This safely prevents the active current from being inadvertently forced to zero in the mode prioritizing reactive power, or the reactive current from being forced to zero in the mode prioritizing active power.

According to one embodiment, it is proposed that at least one of the current limits is transmitted to an external unit, in particular to a grid operator. The external unit is configured as an external control unit, in particular, so that the electric power grid or one of its grid segments can be controlled by it. The external unit is, therefore, a unit that is not part of the converter-controlled feeder. However, it can specify setpoint values, for example, directly or indirectly to the converter-controlled feeder, and it can also control other units within the electric power grid, in particular feeders that are not converter-controlled, and/or switching devices in the electric grid for connecting or disconnecting grid segments. By transmitting this information to the external unit, the latter can control and/or monitor the electric power grid better, and in particular can plan it better.

It is proposed, in particular, that the upper reactive current limit and/or the lower active current limit be adjusted according to active power currently available to the converter-controlled feeder. This therefore applies to the mode prioritizing reactive power, i.e., to the mode in which the reactive current is prioritized. If the converter-controlled feeder is a wind energy system, i.e., a wind turbine or a wind farm, the upper reactive current limit or the lower active current limit may thus depend on the available wind power. However, even in the case where the converter-controlled feeder is a storage unit, or includes one, different amounts of active power may be available to it, namely available for feeding into the electric power grid. This may depend, in particular, on the charge state of the storage unit, such that only an assigned storage power can or may be provided, depending, for example, on the charge state.

It is proposed, in particular, that the lower the active power available to the converter-controlled feeder, the higher the upper reactive current limit. It is proposed, accordingly, that the less active power is available to the converter-controlled feeder, the lower the lower active current limit. It was realized in this regard that a very high reactive current can be fed into the grid even when there is little active power available. It was realized in this regard that it cannot make sense in that situation to set the lower active current limit to a value that is higher, due to the available active power, than the active current which can be fed in. It was also realized, accordingly, that it also makes little sense to specify a respective upper reactive current limit that actually results in a correspondingly lower active current limit. It is therefore proposed that the upper reactive current limit and the lower active current limit be adjusted accordingly.

To implement this, it is proposed, for example, that the current in question (active current or reactive current) be set to a predefined portion of a current (or average) current, e.g., that a minimum current be set to 90% of the current (or average) current.

It is also conceivable, therefore, that the active current limit be made dependent on the current active power and the voltage. Thus, in the mode prioritizing active power, for example, the active power may be allowed to drop to 80% so that the active current limit is calculated from the voltage and the active power limit. Alternatively, the active current limit can be calculated as 80% of the current active current, to remain with the example.

For this and also for all other embodiments relating to the mode prioritizing reactive power, it is proposed that the lower active current limit is a maximum of 30% of the maximum apparent current. It was realized in this regard that an active current amounting to 30% of the apparent current is still a significantly high current that nevertheless imposes hardly any limit on the reactive current. The reactive current would be limited at about 95% of the maximum apparent current. This maximum reactive current, reduced by 5%, means however that up to 30% of the maximum active current can still be fed into the grid. It is proposed, accordingly, that the upper reactive current limit, if this rather than the lower active current limit is specified, amount to at least 95% of the maximum apparent current.

It is proposed in any case, however, that both the lower active current limit and the lower reactive current limit be set to a value greater than zero, and that the upper reactive current limit and the upper active current limit be set to a value less than 100% of the maximum apparent current. Only the limit that is also applied needs to be set in each case, of course.

According to one embodiment, it is proposed that, in fault mode operation, a reactive current droop defining a reactive current according to the grid voltage be predefined in the mode prioritizing reactive power, wherein the reactive current droop specifies a linear relationship between the grid voltage and the reactive current, comprising a reactive current increase which indicates a ratio between a change in reactive current and an associated change in grid voltage. In particular, however, a deadband range may be provided which specifies a voltage range in which the reactive current does not increase, and remains in particular at a value zero. Outside this deadband range, the reactive current thus increases proportionally with a voltage increase, or falls proportionally with a voltage decrease. This allows the voltage increase or voltage decrease to be counteracted by the reactive current.

In this case, the reactive current increases in amount to the upper reactive current limit, at a maximum. The reactive current thus remains, in terms of amount, below the maximum apparent current. The reactive current droop is thus limited to this upper reactive current limit.

In addition to or as an alternative to this embodiment, it is proposed that a fed-in active current be reduced in order to keep it within a maximum permissible apparent current. Thus, if the increase in reactive current due to the reactive current droop causes the apparent current that results with the active current to reach the apparent current limit, the active current would then be reduced in order to allow a higher reactive current for implementing the reactive current droop. However, it is proposed that the active current not be reduced to less than the lower active current limit. In that respect, implementing the reactive current droop is given priority, but only to the extent that the active current does not drop below the lower active current limit. Ideally, the reactive current would then reach an upper reactive current limit. It is sufficient, however, to specify either an upper reactive current limit or a lower active current limit. However, both limits may also be specified and should be reached at the same time if set accordingly.

It is further proposed in this regard that, in normal operation, a reactive current droop comprising a reactive current increase be likewise predefined, and that the reactive current increase is greater in fault mode operation than in normal operation. For fault mode operation, a steeper reactive current droop is thus specified which is also given priority over the active current, but for which the active current is not reduced as far as zero. It was realized that, due to the steeper reactive current droop, it is possible to counteract a corresponding voltage event by limiting that reactive current droop, namely by the upper reactive current limit or the lower active current limit, yet avoid reducing the active current to zero, without the voltage support being significantly affected by the reactive current droop.

For normal operation, a smaller upper reactive current limit, or a greater lower active current limit than in fault mode operation is preferably provided.

According to one embodiment, it is proposed that a grid rigidity be determined as a grid characteristic for the electric power grid, a subgrid or a local grid segment, the grid rigidity being a measure of how strongly the grid frequency changes in response to a change in a power balance in the electric power grid. A power balance is therefore a ratio between the power fed into the electric power grid, the subgrid or the local grid segment, and the power drawn therefrom. The grid rigidity thus describes how strongly the grid frequency responds to a shift in the ratio of fed-in power to drawn power, in particular to it moving out of an equilibrium in which the drawn power is equal to the fed-in power. The less the frequency responds to such a change in the power balance, the more rigid is the grid. This grid rigidity can also be referred to as "frequency rigidity".

The grid rigidity can be defined, in particular, as the quotient of a grid frequency change and a power balance change.

It is now proposed in that regard that at least one current limit, i.e., the upper reactive current limit, the lower active current limit, the upper active current limit and/or the lower reactive current limit, be adjusted according to the grid rigidity. It is proposed, in particular, that the greater the grid rigidity, the higher the amount to which the upper reactive current limit or the upper active current limit is set, and that the greater the grid rigidity, the lower the amount to which the lower active current limit or the lower reactive current limit is set. This is based on the realization that in the case of variable-frequency grids, a higher converter proportion is present and therefore that lowering said lower current limits or raising said upper current limits leads in variable-frequency grids to particularly strong prioritization, as a result of which the non-prioritized current accounts for only a very small proportion. If fault mode operation now occurs, there is a risk that the respective non-prioritized current will only be able to perform its tasks very weakly. If the converter proportion in the respective electric power grid is high, this problem arises in very many feeders, which means that the problem occurs to a high proportion and can therefore lead to a correspondingly large problem as described at the outset. In order to mitigate this, it is therefore proposed in the case of variable-frequency grids that the current limits be set in such a way that as great a proportion as possible of the non-prioritized current remains.

The electric power grid, the subgrid or the local grid segment is preferably classified as a soft or a rigid grid, depending on the grid rigidity, and the at least one current limit is set according to that classification. In this way, it is generally possible to set a priority for the choice of current limits, and especially when such a classification and corresponding selection of current limits is performed for many converter-controlled feeders of the same power grid, subgrid or grid segment, better planning security can be achieved by means of such classification. It is proposed, in particular, that the allocation and resultant choice of current limits be communicated to an external unit, in particular to a grid operator. For any embodiments, it is generally proposed that the respective selected current limits, i.e., the upper reactive current limit, the lower active current limit, the upper active current limit and/or the lower reactive current limit, be communicated to the external unit, in particular to the grid operator.

In addition or alternatively, it is proposed that the at least one current limit be specified according to a proportion of converter-controlled feeders to the electric power grid. It has already been explained above that the proportion of converter-controlled feeders can affect the behavior and thus the characteristics of the electric power grid as a whole, and that it may make sense to select different current limits accordingly. This was realized, in any case, and it was proposed to set at least one of the current limits according to the proportion of converter-controlled feeders.

It is also proposed, additionally or alternatively, that the grid rigidity be determined according to a proportion of converter-controlled feeders to the electric power grid. This has the particular advantage that measurements for determining the grid rigidity can be time-consuming, and that the proportion of converter-controlled feeders is essentially known, instead. In particular if the converter-controlled feeders provide corresponding information to a central unit (control room or grid operator) of the electric power grid, subgrid or grid segment, such information can be easily obtained and processed.

Another option to consider, however, is that power setpoint values be sent to the converter-controlled feeders by a central unit and that the proportion of converter-controlled feeders can be determined on the basis of the assumption that the converter-controlled feeders comply with the specified setpoints. In particular, it is proposed for this and for all other corresponding embodiments that the proportion of converter-controlled feeders be defined as the quotient of the electric power fed into the electric power grid by the converter-controlled feeders and the total active power fed into the electric power grid. Alternatively, the power which can be fed into the grid by the converter-controlled feeders can also be set in relation to the total power which can be fed into the electric power grid. All these definitions apply analogously to the aforementioned subgrid or the local grid segment.

According to one embodiment, it is proposed that the at least one current limit be selected according to a local frequency softness at the grid connection point, and additionally or alternatively that the increase in reactive current of the reactive current droop be specified. There is a local frequency softness at the grid connection point if the grid frequency at the grid connection point oscillates with a greater amplitude than at a reference point in the electric power grid, especially if the grid frequency at the grid connection point oscillates with at least double the amplitude as at the reference point.

In particular, there is also a local frequency softness, and this can be a separate or a supplementary definition, if there is a local voltage softness in a grid segment of the electric power grid and a low proportion of voltage-shaping feeders in the grid segment.

Synchronous generators directly coupled to the grid segment are also to be regarded as voltage-shaping feeders.

A local voltage softness exists, in particular, if a percentual change in the power fed into the grid segment, relative to a resultant percentual change in the grid voltage at a reference point in that grid segment falls below a predetermined comparative value for local voltage softness. A value of 10 or less is specified as a predetermined comparative value for local voltage softness. With a value of 10, a local voltage softness is therefore present if the power fed into the grid segment is doubled (i.e., increased by 100%), and the grid voltage at the reference point in that grid segment is increased as a result by at least 10% (100%/10%=10).

A local voltage softness is also present, in particular, if the grid segment has a comparatively high impedance.

A person skilled in the art will distinguish between voltage-shaping and current-shaping feeders. In the case of voltage-shaping feeders, the primary objective of control is to maintain or specify a voltage during infeed, namely a grid voltage or infeed voltage. In the case of current-shaping feeders, the primary control objective is to feed in a specified current. Synchronous generators directly coupled to the electric power grid behave as voltage-shaping feeders due to the physical characteristics of the synchronous generator, whereas converter-controlled feeders, especially wind energy systems or PV systems, typically behave in a current-shaping manner.

A low degree of voltage-shaping feeders is present on the grid segment if a ratio of the total power fed in by the voltage-shaping feeders to the total power fed in by all the feeders in the grid segment is less than a reference ratio, which in particular is less than 0.2 and more particularly less than 0.1.

The phenomenon or situation existing here, therefore, is that, although the electric power grid as a whole may be rigid, there is a grid with frequency softness, i.e., a grid segment with frequency softness, in one grid segment, namely the one to which the grid connection point is also connected. Such a grid segment with a local frequency softness, referred to here as local frequency softness, may arise when that particular grid segment has a high proportion of converter-controlled feeders.

It is therefore proposed that at least one current limit be selected according to the local frequency softness, and/or that the increase in reactive current be selected according thereto, in order to adjust the controllability of the converter-controlled feeder.

The ratio of the amplitude of oscillation of the grid frequency at the grid connection point to the amplitude of the oscillation of the grid frequency at the reference point can provide a measure of the local frequency softness. It is proposed that the at least one current limit and also or alternatively the increase in reactive current be preferably specified according to this measure of local frequency softness. This allows the controllability of the converter-controlled feeder to be adjusted accordingly. It is proposed, in particular, that the greater the measure of local frequency softness, the smaller the upper reactive current limit that is selected, in order to ensure that the active power infeed is sufficiently adjustable. This means accordingly, in addition or alternatively, that the greater the measure of local frequency softness, the higher the lower active current limit that can be set.

Since a grid segment with frequency softness can also be accompanied by a grid segment with voltage softness, it is proposed, according to one variant, that the greater the degree of local frequency softness, the less the adjustability of the reactive power be limited in the operating mode which prioritizes active current. Accordingly, the greater the degree of local frequency softness, the lower the setting for the upper active current limit, or the higher the setting for the lower reactive current limit.

According to one embodiment, it is proposed that the reactive current droop, in particular the increase in reactive current of the reactive current droop, be specified according to the grid rigidity, especially in the event of a fault. In this case, the absolute grid rigidity as defined above is specially taken into account. It was realized that the reactive current droop can be adjusted according to the grid rigidity in order to ensure that the reactive current is controlled appropriately. This reactive current control can be adjusted, in particular, by the increase in reactive current of the reactive current droop. However, other changes in the reactive current droop can also be considered, and it is possible in particular to change a deadband range, which therefore can also then be changed according to the grid rigidity.

The increase in reactive current of the reactive current droop can be specified according to the local frequency softness, in particular according to a measure of local frequency softness, and in that way the behavior of the reactive current control of the converter-controlled feeder can be adapted to the situation in the electric power grid.

It is proposed, in addition or alternatively, that the reactive current droop, in particular the increase in reactive current of the reactive current droop, be specified according to a proportion of converter-controlled feeders to the electric power grid. Such a proportion of converter-controlled feeders, which is specifically defined as the ratio of active power currently fed in by all the converters to the total fed-in active power, allows conclusions to be drawn about the behavior of the electric power grid, which therefore means that a correspondingly adjusted reactive power control can be specified by setting the reactive current droop accordingly.

It is proposed, in particular, that the greater the proportion of converter-controlled feeders, the greater the magnitude of the increase in reactive current. This is based on the realization that the more dominant the converter-controlled feeders are, the stronger the voltage support provided by the converter-controlled feeders using the reactive current droop should be. If the proportion of converter-controlled feeders is small, it is more likely that the voltage support will be provided by other units anyway, in particular by conventional power stations that have synchronous generators coupled directly to the electric power grid. The reactive current droop of converter-controlled feeders is then needed primarily as support, so weak control of reactive current may be sufficient.

It is proposed, in particular, that the reactive current droop be specified in fault mode operation. It was realized in this regard that, in fault mode operation especially, it is important that the control system be involved by feeding in reactive power by means of the converter-controlled feeders. It was realized in this regard that converter-controlled feeders have a very fast control capability which can be used here. This allows a synergistic effect to be achieved with the special type of control in fault mode operation. In this case, the reactive current droop can be adapted to support the voltage, if necessary with a very steep increase in reactive current, while simultaneously maintaining good control capability due to the proposed current limits, without the prioritization of the reactive current preventing control by the active current and vice versa.

According to one embodiment, it is proposed that a converter proportion be calculated as a proportion of converter-controlled feeders for the electric power grid, or for a segment of the electric power grid. It has already been explained above that it was realized that this allows conclusions to be drawn about characteristics of the electric power grid or a segment thereof, and that this can therefore provide a basis for settings of the converter-controlled feeder being used.

The converter proportion for the electric power grid or the grid segment can denote a ratio of the currently fed-in active power from all the converter-controlled feeders to the total active power currently fed in. In this way, the current situation in the electric power grid with regard to the converter proportion in the electric power grid can always be taken into account.

Alternatively, the converter proportion for the electric power grid or grid section can denote a ratio of the active power which can be fed in by all the converter-controlled feeders to the active power which can be fed in by all the converter-controlled feeders to the active power which can be fed in by all the feeders. The nominal power of the respective feeder can be used here as the active power which can be fed in, so the converter proportion thus denotes a ratio of the sum of the nominal power ratings of all the converter-controlled feeders to the sum of the nominal power ratings of all the feeders. Although taking the converter proportion into account as such a ratio of powers that can be fed in may have the disadvantage of not accurately reflecting current situations, it is a fixed quantity that can therefore be easily determined as well. If necessary, an adjustment factor can be taken into account if a correspondingly low power output from the converter-controlled feeders can be expected due to the prevailing wind and/or the prevailing insolation. It is necessary to take into account, and this has also be realized here, that converter-controlled feeders also and increasingly have electrical storage capacity. In this case, the power which can be fed in is particularly relevant for support measures, despite a currently low amount of active power infeed, and is also accessible and available—for a short period at least—due to the electrical storage unit.

Depending on the converter proportion, it is proposed that specifying at least one of the current limits only be carried out if the converter proportion exceeds a predetermined minimum converter proportion and the minimum converter proportion is at least 50%. It was realized in this particular regard that when the converter proportion is low, in particular when it is less than 50%, the loss of active power adjustability in the operating mode prioritizing reactive power, or the loss of reactive power adjustability in the operating mode prioritizing active power can be accepted, as the other feeders then account for more than 50% and are mostly able to compensate for or at least absorb the converter-controlled feeder's lack of control capability, due to their physics, particularly when they each have a synchronous generator coupled directly to the electric power grid. It was thus realized that in this case the full adjustability of each converter-controlled feeder can be provided, i.e., the full adjustability of the reactive current up to the apparent current limit in the operating mode prioritizing reactive power, and the full adjustability of the active current up to the apparent current limit in the operating mode prioritizing active current.

A converter-controlled feeder is also proposed. Such a feeder is configured, in particular, as a wind energy system, i.e., as a wind turbine or a wind farm, or it is designed as a storage unit. Another option is to combine a wind energy system with a storage unit. Such a converter-controlled feeder, i.e., in accordance with any of the aforementioned embodiments, is configured to feed electric power at a grid connection point into an electric power grid having a grid voltage. The converter-controlled feeder comprises:

an infeed unit for feeding the electric power into the electric power grid in a normal operating mode when no grid fault has been detected in the electric power grid; and an infeed controller for switching to fault mode operation if a grid fault or malfunction has been detected, with which the grid voltage is reduced, wherein the converter-controlled feeder, in particular the infeed controller, is adapted so that in the normal operating mode:
an active current is fed in in order to feed active electric power into the grid; and
if the need arises, a reactive electric power is additionally fed into the grid by a reactive current, wherein the combination of the active current and the reactive current results in an apparent current; and in fault mode operation:
an additional reactive current is fed into the grid in order to increase or decrease the grid voltage ($U_N$), or is increased in magnitude, wherein
a mode prioritizing reactive power or a mode prioritizing active power is used, and
the mode prioritizing reactive power is characterized in that the active current is reduced, when the need arises, in such a way that the apparent current keeps within an apparent current limit, and the mode prioritizing active power is characterized in that the reactive current is limited or reduced, when the need arises, in such a way that the apparent current keeps within the apparent current limit, wherein in the mode prioritizing reactive power:
an upper reactive current limit is specified for the magnitude of the reactive current; and/or
a lower active current limit is specified for the active current, or in the mode prioritizing active power:
an upper active current limit is specified for the active power; and/or
a magnitude for a lower reactive current limit is specified for the reactive current.

An infeed unit may be formed, in particular, by one or more converters or inverters. A plurality of inverters can be fed via an intermediate DC circuit, from which they feed into the electric power grid, in particular as a parallel circuit.

The infeed controller controls this infeed unit and if necessary can also control other elements, such as the entire operation of a wind turbine, or the storage of electric energy in or the removal of electric energy from the storage unit. The storage unit may be designed, in particular, as an electric storage unit, in particular as a battery storage unit. However, the control functions can also be distributed over a plurality of elements, for example such that the infeed controller controls only the infeed unit, and other elements of the converter-controlled feeder are controlled by an operational controller.

The infeed controller can also switch between normal operation and fault mode operation. Such a switchover can be controlled by software, in that respective control programs or control rules are applied for normal operation and fault mode operation. Taking different current limits for reactive current and/or for active current into account, be they upper limits or lower limits, can readily be done by a prior art converter or inverter, and is also common.

The infeed unit can preferably be designed as an inverter which is controlled using a tolerance band method. In this case, a tolerance band is specified for an output current, the resultant output current is measured, and depending on where this output current lies within this specified tolerance band, the semiconductor switch of the inverter is controlled accordingly. The output current is thus measured, also in connection with the output voltage, so there is always knowledge about the currently fed-in current, including the active current component and the reactive current component. The active current and the reactive current can thus be specified and controlled by specifying the tolerance band accordingly.

It is possible with such a converter-controlled feeder to implement all the aforementioned options and advantages of a method for feeding electric power into a grid.

It is proposed, in particular, that the converter-controlled feeder, in particular its infeed controller, be configured to carry out a method according to one of the embodiments described in the foregoing. For that purpose, each of these methods can be stored as a control program, for example.

BRIEF DESCRIPTION OF THE SEVERAL VIEWS OF THE DRAWINGS

Exemplary embodiments of the disclosure shall now be described in greater detail with reference to the accompanying figures, in which.

DETAILED DESCRIPTION

Figure 1:
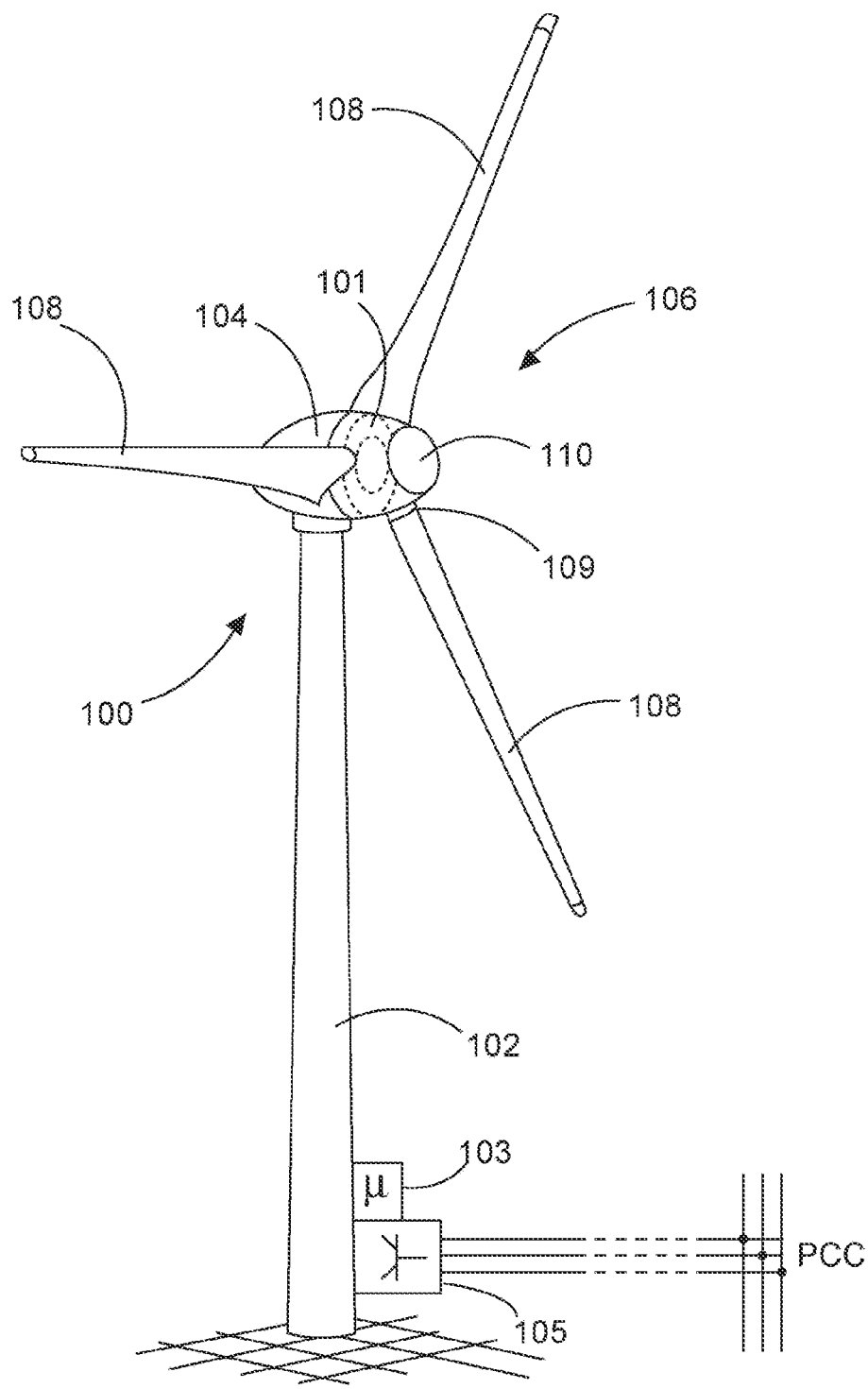
FIG. 1 shows a perspective view of a wind turbine.

FIG. 1 shows a schematic view of a wind turbine. Wind turbine 100 has a tower 102 and a nacelle 104 on tower 102. An aerodynamic rotor 106 having three rotor blades 108 and a spinner 110 is provided on nacelle 104. During operation of the wind turbine, aerodynamic rotor 106 is made to rotate by the wind, thus resulting in rotation of an electrodynamic rotor of a generator which is coupled directly or indirectly to aerodynamic rotor 106. The electric generator is arranged in nacelle 104 and generates electric energy. The pitch angle of rotor blades 108 can be changed by means of pitch motors at the blade roots 109 of the respective rotor blades 108.

Wind turbine 100 has an electric generator 101, which is indicated in nacelle 104. Electric power can be generated by means of generator 101. An infeed unit 105, which can be in the form of an inverter, is provided for feeding electric power into the grid. This can be used to produce a three-phase infeed current having an amplitude, a frequency and a phase, for feeding into the grid at a grid connection point PCC. That can be done directly, or also collectively with other wind turbines in a wind farm. A system controller 103 is provided to control wind turbine 100 and also infeed unit 105. System controller 103 can also receive externally specified values, in particular from a central wind farm computer.

Figure 2:
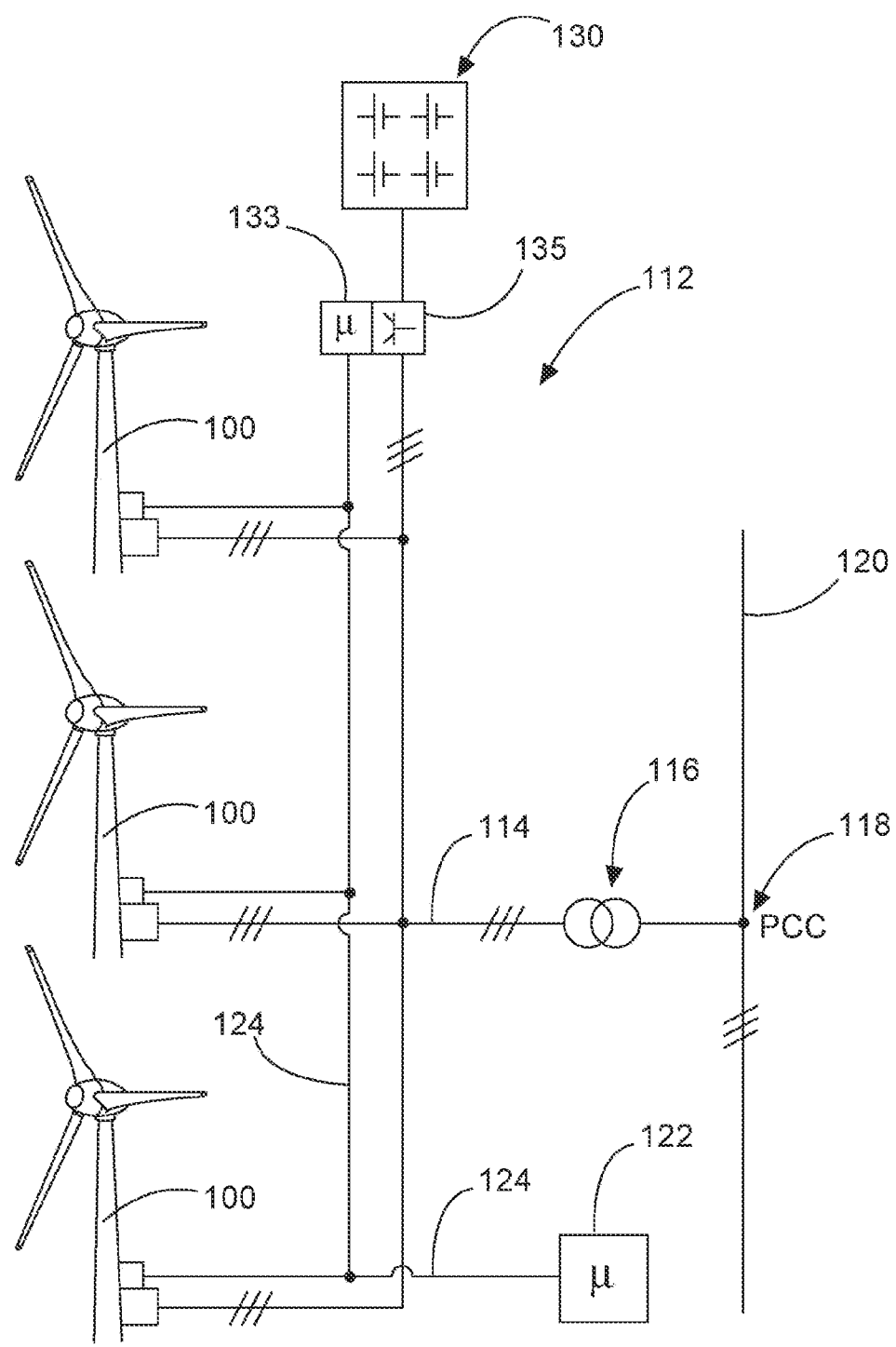
FIG. 2 shows a schematic view of a wind farm.

FIG. 2 shows a wind farm 112 comprising, in this example, three wind turbines 100, which may be identical or different. The three wind turbines 100 are thus representative of basically any number of wind turbines in a wind farm 112. Wind turbines 100 deliver their power, namely the generated current, via an electrical wind farm network 114. The respective current or power outputs respectively generated by the individual wind turbines 100 are added up, and a transformer 116 is usually provided that transforms the voltage in the wind farm in order to feed it into supply network 120 at infeed point 118, which is also referred to generally as the point of common coupling (PCC). FIG. 2 is only a simplified view of a wind farm 112, which does not show any controller, for example, even though a controller is, of course, present. Wind farm grid 114 may also be designed differently, for example by a transformer also being provided at the output of each wind turbine 100, to mention just one other embodiment.

Wind farm 112 also has a central wind farm computer (controller) 122. This can be connected to wind turbines 100 via data lines 124, or wirelessly, so as to exchange data with the wind turbines via those connections, in particular to receive measured values from wind turbines 100 and to transmit control values to wind turbines 100.

FIG. 2 also shows a storage unit (battery) 130, which can also be operated in conjunction with wind turbines 100, or which can also be used on its own as a converter-controlled feeder. For that purpose, storage unit 130 has an infeed unit (inverter) 135 which can be controlled by means of a storage controller 133. Storage controller 133 can be connected to the central wind farm computer in order to be controlled by the latter. Storage unit 130, comprising infeed unit 135 and storage controller 133, can also be operated independently, without wind turbines 100 and without the central wind farm computer 122, and can feed into electric power grid 120 at its own grid connection point. The infeed unit 135 of storage unit 130 can be constructed like infeed unit 105 of wind turbine 100 and can be operated accordingly.

Figure 3:
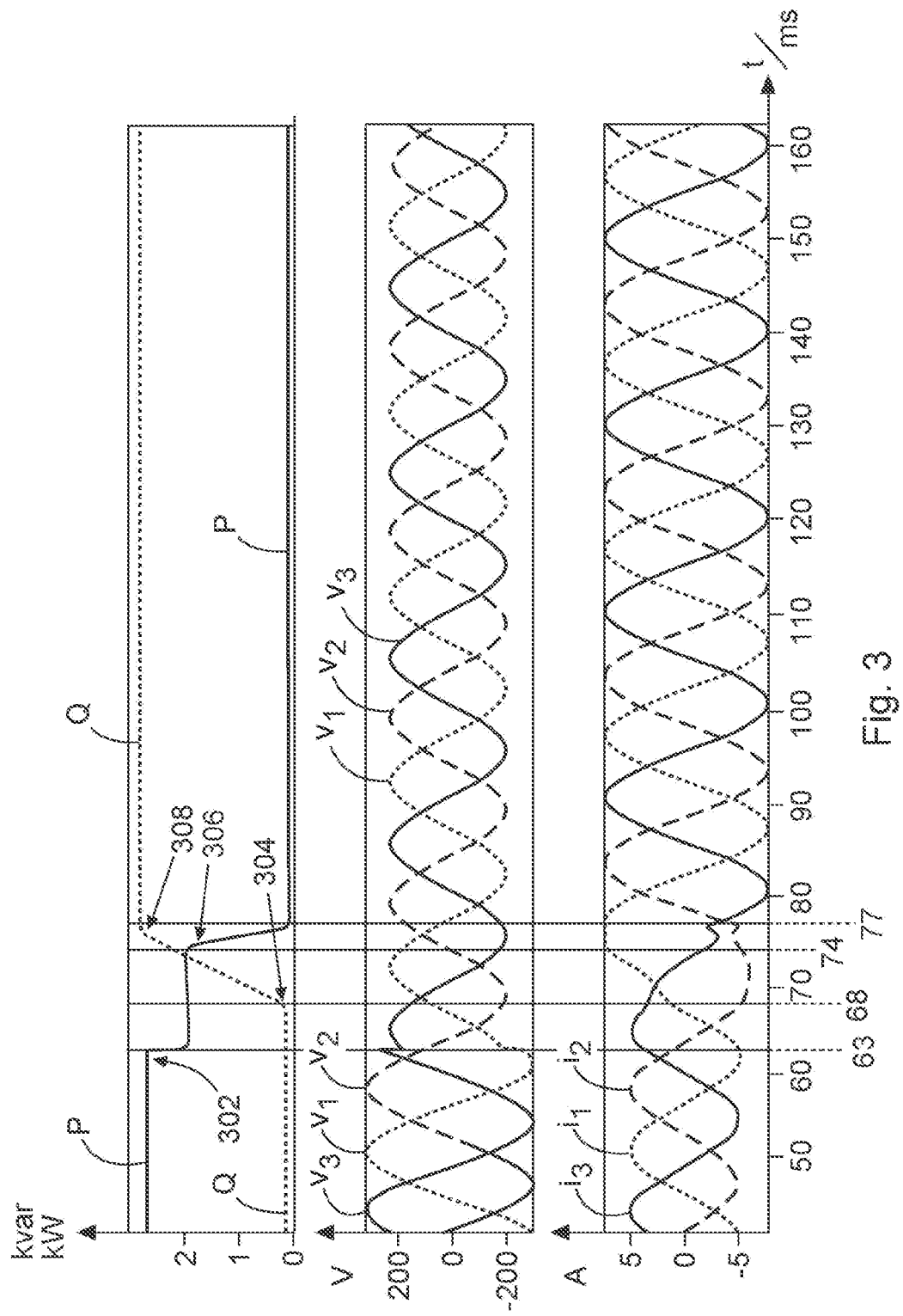
FIG. 3 shows a diagram, for the prior art, with power curves, voltage curves and current curves in the case of a fault.

FIG. 3 shows a diagram containing three individual diagrams. The top diagram shows a curve for active power P and reactive power Q. The middle curve shows a grid voltage curve for all three grid phases $v_1$, $v_2$ and $v_3$. The diagram at the bottom shows the curves for the three-phase current fed into the grid, with the three phase currents $i_1$, $i_2$ and $i_3$. A time axis is also entered as an abscissa on the bottom diagram, showing the time in ms. This time, axis applies to all three subdiagrams.

In the middle diagram, the voltage is entered in volts, although the absolute amplitude is less important. What is more important is the change in amplitude. At 63 ms, for example, a voltage drop can be seen, particularly in the first phase voltage $v_1$ and the third phase voltage $v_3$. The second phase voltage $v_2$ is approximately zero at that moment, so the voltage drop is less noticeable there at that moment. From that point in time at about 63 ms, i.e., at the start of the voltage drop, the amplitude of these three voltages $v_1$, $v_2$ and $v_3$ is therefore reduced, and in that respect FIG. 3 is based on a simulation in which the grid voltage is specified in the form of the three phase voltages $u_1$, $u_2$ and $u_3$. In the middle diagram of FIG. 3, it is apparent that the amplitude of the voltage or the three individual voltages has dropped by about 50% from time t at 63 ms.

In the top diagram, the fed-in active power P and the fed-in reactive power Q are entered with the units kW and kvar, respectively. When a voltage drop occurs at 63 ms, the active power P also drops accordingly and immediately, which is entered in the diagram as a fault occurrence 302. Before fault occurrence 302, the situation was one in which no reactive power Q was fed into the grid. About 5 ms then elapse after fault occurrence 302 until, to provide voltage support, an increase in fed-in reactive power begins, namely from zero in the case shown here. This is entered as the point 304 where the reactive power increase starts. The active current initially remains at a constant level, i.e., there is no change in its amplitude. At about 74 ms, the reactive current Q has then become so large that the apparent current, which as is known is composed of the active current and the reactive current, has reached a maximum value. In the top diagram of FIG. 3, this is entered as the point 306 where the current limit is reached.

However, the fed-in reactive power Q is to be increased further, and to that end the active power P is then reduced to zero, since that the maximum value of the apparent current may not be exceeded. At about 77 ms, the reactive power Q has then reached its maximum value. This is entered as the maximum reactive power 308. The active power P has then reached zero. The amplitude of the reactive current corresponds, therefore, to the maximum apparent current.

The current curves can be seen in the bottom diagram. Before the error occurs, i.e., before the 63 ms mark, it can be seen that the three phase currents $I_1$, $I_2$ and $I_3$ have no phase shift compared to the three phase voltages $u_1$, $u_2$ and $u_3$. At 68 ms at the latest, i.e., at the start of reactive power increase 304, the current enters a transition. At 74 ms, i.e., the time 306 at which the current limit is reached, the first phase current $i_1$ has reached its maximum value, as can clearly be seen in the bottom diagram. From 77 ms, i.e., when the maximum reactive power at reference sign 308 has been reached, the transition of the three phase currents is terminated and it can be seen, for example, that there is a phase shift of 90° between the three phase currents $I_1$, $I_2$ and $I_3$, on the one hand, and the three associated phase voltages $u_1$, $u_2$ and $u_3$, on the other hand. This means that only reactive power is fed into the grid.

The problem here is that the active power P has dropped completely to zero and therefore can no longer make any contribution. It can neither contribute any power to the supply grid, nor can it provide any support. In particular, in can no longer produce any frequency-supporting effect.

Figure 4:
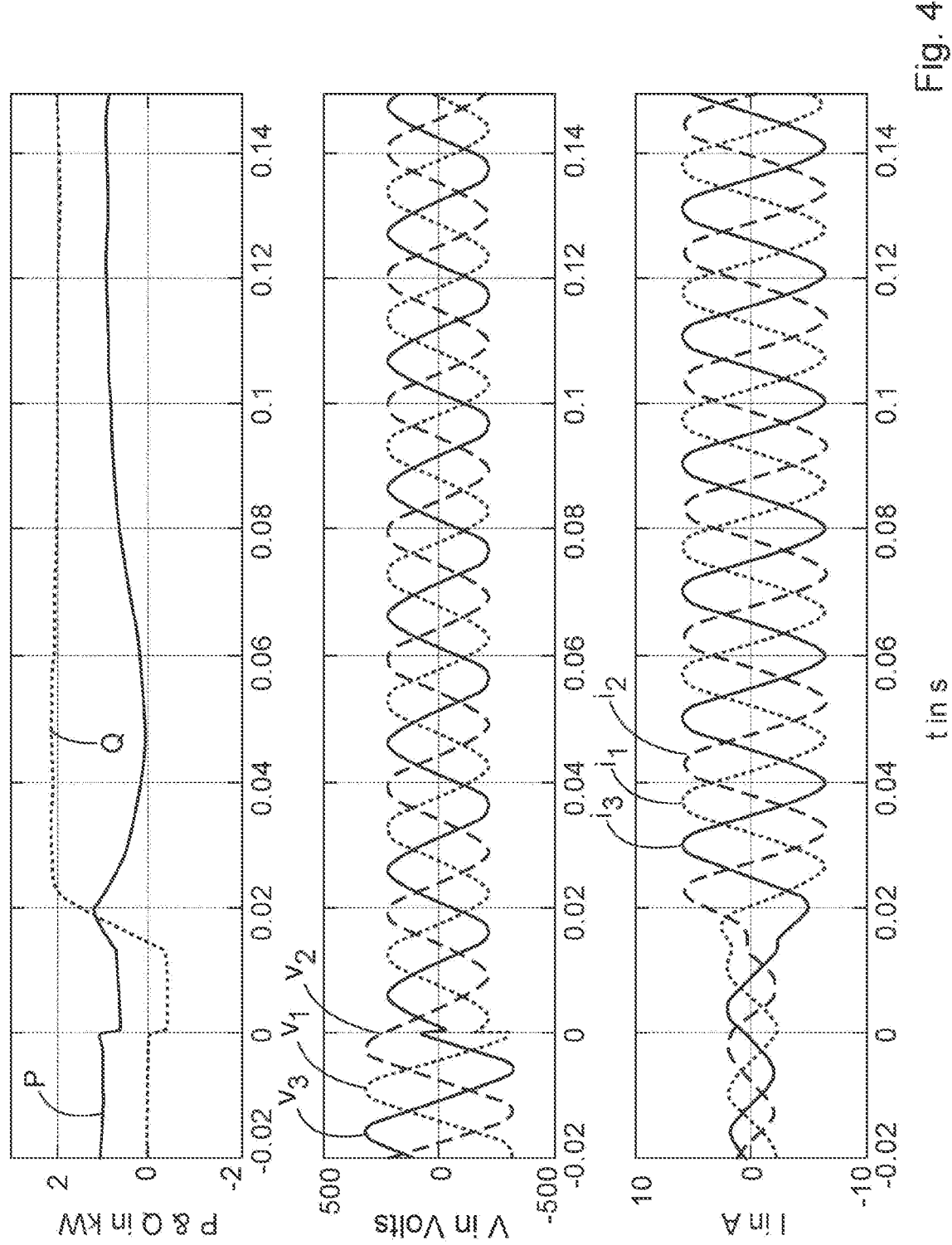
FIG. 4 shows a diagram with power curves, voltage curves and current curves according to a proposed variant.

FIG. 4 shows a proposed improvement in that respect, and the diagrams in FIG. 4 are based, in terms of the views shown, on the diagrams in FIG. 3. In FIG. 4, the fault occurs at time t=0, and in this case also, the voltage drop at voltage $u_1$ can be seen, in particular. Parallel to that, a jump in the voltage phase can also be seen here. There is then an immediate drop in active power P. A change in the reactive power value can also occur in the transition, in particular by the jump in the phase of the external voltage.

At approximately 15 ms, the reactive power Q is then increased. The active power P also increases somewhat, due to the attempt to balance the active power. At approximately 20 ms, a current limit for the apparent current is also reached, so the active current is reduced in order to increase the reactive current further. The reactive power Q continues to increase, therefore, whereas the active power P then decreases.

In FIG. 4, unlike FIG. 3, there is also a jump in the voltage phase. This results in the drop in reactive power Q shown, and it can also lead to an additional delay in the infeed, because it is firstly necessary that the reference system be found, i.e., the frequency and especially the phase of the grid voltage, meaning that the infeed must be adapted thereto.

However, it is now proposed in this regard that the active current and thus the active power are not to be reduced completely to zero. It can also be seen in this regard from the top diagram in FIG. 4 that the active power P increases again somewhat and finally reaches, at about 100 ms, a final— albeit lower—value. It can be seen that, parallel to that, the reactive power Q drops only insignificantly. It was thus possible for control potential by active power P to be maintained, without the voltage-supporting effect of reactive power Q being impaired to any significant extent.

In FIG. 4, a waiting period is also implemented, such that the active power initially drops to zero and is then increased in such a way that the active current reaches or exceeds the lower active current limit.

It can also be seen from FIG. 4 that the solution presented there manages to support the voltage by providing an additional reactive current, but without a permanent reduction in the active power.

Figure 5:
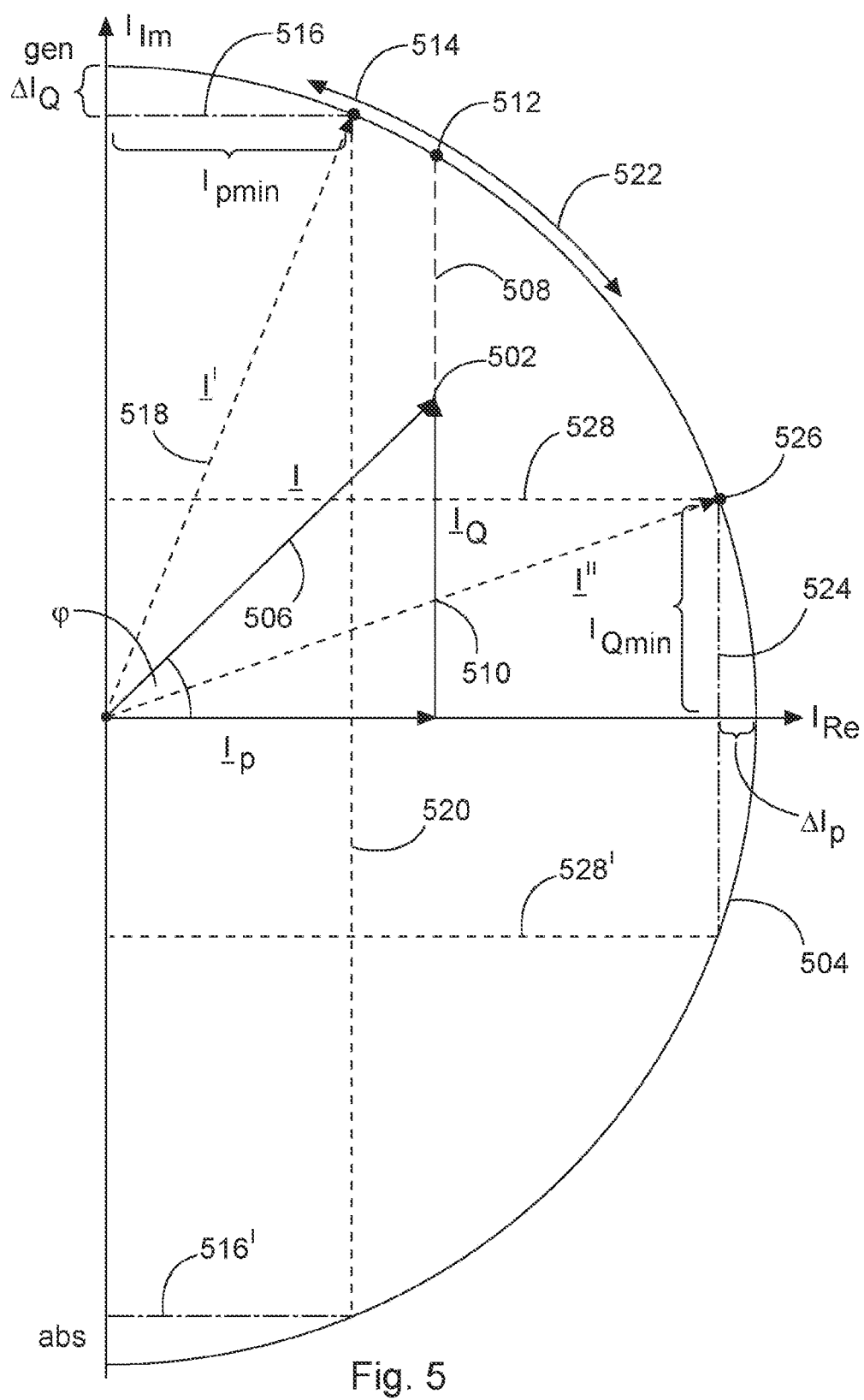
FIG. 5 illustrates different operating points for a fed-in current in the complex plane.

In a diagram in the complex plane, FIG. 5 illustrates the method of feeding electric power by showing different apparent currents, which can also be referred to as total currents or as fed-in currents. Apparent current $\underline{I}$, shown here by way of example, is composed of an active current $\underline{I}_P$ and reactive current $\underline{I}_Q$. The tip of the current phasor of apparent current $\underline{I}$ thus indicates the present operating point 502 of the present infeed of electric power by means of the converter-controlled feeder. An apparent current limit 504 is also drawn in as a semicircle. The amount of apparent current may not exceed the value of the apparent current limit 504, because safety switches would otherwise be triggered. The apparent current $\underline{I}$ and the apparent current phasor 506 drawn in for it may therefore extend at a maximum to the semicircle specifying the apparent current limit 504.

Operating point 502 represents a situation in normal operation. The magnitude of active current $I_P$ is then determined substantially by the available wind power, if the converter-controlled feeder is a wind turbine or a wind farm. For illustration purposes, a relatively large phase angle φ has been selected. In normal operation, especially when no voltage support is provided, this phase angle φ can also have the value zero. In that case, the magnitude of the reactive power $I_Q$ would also be zero.

If a fault now occurs, the converter-controlled feeder switches into fault mode operation. A grid fault or grid malfunction resulting in a reduction in grid voltage is assumed here. The reduction in grid voltage can also be referred to as a voltage drop. The aim now is for this to be counteracted in fault mode operation by the converter-controlled feeder. In other words, the electric power grid is to be supported by the converter-controlled feeder.

To that end, the reactive power and thus the reactive current $I_Q$ is increased in amount in the mode prioritizing reactive power, which is one of two described options in fault mode operation. It is proposed, in particular, that this increase be initiated within a response time of 5 ms, in particular. The reactive current $I_Q$ then increases, which is shown as reactive power increase 508 in the diagram in FIG. 5, namely by a broken line that extends the reactive current $I_Q$ and the reactive current phasor 510 associated with it. However, the reactive current $I_Q$ can only be increased, at a maximum, to the point where the apparent current limit 504 is reached. This initially results in a first new operating point 512, therefore, which thus lies on the semicircle indicating the apparent current limit 504.

In order to increase the reactive current even further, the active current would have to be reduced. The operating point could then move from the first new operating point 512 along the apparent current limit 504, i.e., along the drawn semicircle. In FIG. 5, this is shown as a further increase in reactive current 514, indicated by a corresponding arrow along the apparent current limit 504. It can be seen that the reactive current $I_Q$ can increase still further as a result. The active current $I_P$ decreases in the process. It can also be see in this regard that the increase in active current $I_Q$ is relatively small in comparison with the reduction in active current $I_P$. Especially in the case of very large reactive currents $I_Q$ whose magnitudes have almost reached the value of the apparent current limit, very large reductions in the active current must be made to obtain further small increases in the reactive current. To prevent this from happening, an upper reactive current limit 516 can be provided.

If the reactive current is increased to this upper reactive current limit 516, the result is the changed apparent current $I'$ shown by the changed apparent current phasor 518. Up to the maximum possible value of the reactive current, there remains a reactive current difference $\Delta I_Q$, which cannot be reached due to the upper reactive current limit 516. However, this means that a minimum active current $I_{Pmin}$ which is many times greater than the reactive current difference $\Delta I_Q$ can be fed in.

Thus, by doing without a small reactive current component, a large active current component is made possible. The minimum active current $I_{Pmin}$ can also be taken, alternatively or additionally to specifying the upper reactive current limit 516, as a lower active current limit 520. The minimum active current $I_{Pmin}$ is thus ensured if the reactive current does not exceed the upper reactive current limit 516 and/or the active current does not fall below the lower active current limit 520.

In principle, a reactive current can also be drawn from the electric power grid for voltage support purposes. This is also referred to commonly as "absorption", whereas positive infeed is referred to as "generation". In FIG. 5, these two variants are abbreviated to "abs" and "gen", respectively. In addition to the upper reactive current limit 516, accordingly, there is an upper reactive current limit 516' for the case of reactive power withdrawal. The adjusted upper reactive current limit 516' may not be exceeded in amount, either, therefore.

The above observations concerning FIG. 5 related to the mode prioritizing reactive power, in which there is therefore a prioritization of reactive power or reactive current. This prioritization of reactive current is limited, however, by the upper reactive current limit 516 or 516', or by the lower active current limit 520.

In a mode prioritizing active power, the active power or active current is prioritized. Nevertheless, in the event of a fault, i.e., when the operating mode is switched to fault mode operation, the reactive current is initially increased to support the voltage, also from operating point 502, for example, to the first new operating point 512 in accordance with the reactive current increase 508.

However, in the mode prioritizing active power, the aim is to feed in as much active power as possible in order to maintain as far as possible a currently required active power infeed. If the grid voltage drops and hence also the infeed voltage, this will invariably result in a reduction in active power if the active current remains constant. In order to increase the active power back to its original value, as far as possible, it is necessary to increase the active current. That is precisely what is proposed in the mode prioritizing active power. Proceeding from the first new operating point 512, the active current is then increased, while the reactive current is simultaneously reduced so that the apparent current limit 504 is not exceeded. The operating point then moves accordingly from the first new operating point 512 along the semicircle forming the apparent current limit 504, in a "downwards" direction as shown in FIG. 5. A further increase in active current 522 is shown as corresponding arrow to illustrate this change in the operating point.

However, it is now specified, also in the mode prioritizing active power, that the prioritized current is not to increase to 100%, with the consequence that the non-prioritized current, in this case the reactive current, is not reduced to zero. An upper active current limit 524 is specified for that purpose. The active current can thus be increased until it reaches the upper active current limit 524. The reactive current has decreased accordingly, and the new operating point 526 is set. This results in the changed apparent current $I''$. Due to the upper active current limit 524, it was not possible to increase the active current to the maximum value, namely to the value of the upper limit for the apparent current. An active current difference $\Delta I_P$ thus remains, which indicates the current that cannot be fed into the grid.

At the same time, however, the reactive current has only been reduced to the minimum reactive current $I_{Qmin}$. The remaining or minimum reactive current $I_{Qmin}$ is many times greater than the active current difference $\Delta I_P$. By limiting the active current increase to a value which is only slightly below the maximum value, it was nevertheless possible to ensure that a relatively large reactive current infeed is possible. This can be achieved by increasing the active current to the upper active current limit, at a maximum, or by not reducing the reactive current below the minimum reactive current $I_{Qmin}$, or by complying with both criteria. The lower reactive current limit 528 thus limits the drop in reactive current in the respective quadrants. When reactive current is drawn from the grid, a lower reactive current limit 528' can be set accordingly for drawing reactive current. The amount should not be any less than that limit. The upper active current limit 524 acts in unchanged manner in this quadrant, in which reactive current is drawn.

A solution is thus proposed in which a mode of operation prioritizing reactive power and a mode of operation prioritizing active power can both be implemented in the event of a fault if the grid voltage drops, while simultaneously preventing the respective non-prioritized current, i.e., the active current or the reactive current, from dropping too strongly, and in particular from dropping to zero.

In this way, it is also possible to improve so-called FRT strategies, i.e., strategies that are designed to ride through any grid fault.

For an operating mode prioritizing reactive current and/or for an operating mode prioritizing active current, which can also be referred to synonymously as control prioritizing reactive power or as control prioritizing active power, respectively, one idea in particular, in the event of a fault, is to add dynamic reactive current or active current limits, or to specify a minimum active current or a minimum reactive current if priority is given to reactive current or active current.

The proposed solutions can be used for wind turbines, in particular for those with FACTS characteristics and with parameterized dynamic grid support. They can be applied not only to storage units, but also to charging infrastructure with parameterized dynamic grid support. It should be possible, in particular, to improve the grid characteristics in grids with voltage softness and frequency softness. This can be achieved, in particular, by adjusting the dynamic limits or minimum current levels.

A fault ride-through strategy for grids with a high proportion of converters has also been proposed in this regard. The proposed grid fault ride-through strategy is also suitable here for grids with voltage softness and frequency softness, in particular. In some cases, stable fault detection and grid stabilization can also be achieved so that system responsibility can be assumed by the respective converter-controlled feeders.

It was realized that known methods for prioritizing active and reactive current are well suited to grids having a low penetration of renewables. This gave rise to the idea of adding dynamic reactive current limits or dynamic active current limits to the aforementioned operating modes, namely to the mode prioritizing reactive power in fault mode operation and to the mode prioritizing active power in fault mode operation.

It is also possible, alternatively or additionally, to specify a minimum active current when priority is given to reactive current, or a minimum reactive current when priority is given to active current.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of feeding electric power at a grid connection point into an electric power grid having a grid voltage using a wind energy system and/or battery, the method comprising:
   feeding the electric power into the electric power grid in a normal operating mode in which a grid fault or grid malfunction in the electric power grid has not been detected; and
   in response to detecting the grid fault or grid malfunction, in which the grid voltage increased or decreased, switching to a fault mode operation, wherein:
   in the normal operating mode,
      feeding an active current to feed active electric power into the electric power grid; and
      in response to detecting a current requirement, using a reactive current to additionally feeding a reactive electric power into the electric power grid, wherein a combination of the active current and the reactive current results in an apparent current, and
   in the fault mode operation,
      feeding an additional reactive current into the electric power grid or increasing a magnitude of the reactive current to increase or decrease the grid voltage; and
   using a mode prioritizing reactive power or a mode prioritizing active power,
   wherein:
      in the mode prioritizing reactive power, the active current is reduced such that the apparent current remains within an apparent current limit, and
      in the mode prioritizing active power, the reactive current is limited or reduced such that the apparent current remains within the apparent current limit, and
   wherein:
      in the mode prioritizing reactive power:
         an upper reactive current limit is set for the magnitude of the reactive current; and/or
         a lower active current limit is set for the active current, or
      in the mode prioritizing active power:
         an upper active current limit is set for the active current; and/or
         a magnitude for a lower reactive current limit is set for the reactive current.

2. The method according to claim 1, comprising:
   in the fault mode operation, switching from the mode prioritizing reactive power to the mode prioritizing active power or from the mode prioritizing active power to the mode prioritizing reactive power.

3. The method according to claim 2, comprising:
   in response to the apparent current reaching the apparent current limit, switching the upper reactive current limit or the lower active current limit from the mode prioritizing reactive power to the mode prioritizing active power; or
   in response to the apparent current reaching the apparent current limit, switching the upper active current limit or the lower reactive current limit from the mode prioritizing active power to the mode prioritizing reactive power.

4. The method according to claim 1, comprising:
   dynamically changing at least one current of:
      the upper reactive current limit,
      the lower active current limit,
      the upper active current limit, and
      the lower reactive current limit.

5. The method according to claim 4, wherein the dynamically changing the at least one current includes:
adjusting the at least one current according to a grid characteristic of the electric power grid; or
causing the at least one current to be set or become effective after a predetermined time waiting period from switching to the fault mode operation has been made; and/or
transmitting the at least one current to an external grid operator.

6. The method according to claim 1, comprising:
adjusting the upper reactive current limit and/or the lower active current limit according to the active power currently available to the wind energy system and/or battery.

7. The method according to claim 1, wherein,
in the fault mode operation,
the method includes setting a fault mode reactive current droop specifying the reactive current in relation to the grid voltage in the mode prioritizing reactive power, wherein:
the fault mode reactive current droop, outside a deadband range, specifies a linear relationship between the grid voltage and the reactive current, and the fault mode reactive current droop includes a fault mode reactive current increase indicating a ratio between a change in the reactive current and an associated change in the grid voltage, and
the fault mode reactive current increases at most to the upper reactive current limit, and/or the active current is reduced to retain the apparent current within a maximum permissible apparent current, wherein the active current is not reduced below the lower active current limit; and
in the normal operating mode, a normal mode reactive current droop including a normal mode reactive current increase is set, and the normal mode reactive current increase is greater than the fault mode reactive current increase.

8. The method according to claim 1, comprising:
determining a grid rigidity as a grid characteristic of the electric power grid, a subgrid or a local grid segment, wherein the grid rigidity is a measure of a grid frequency change in response to a change in a power balance in the electric power grid, and wherein the power balance denotes a ratio between the electric power fed into the electric power grid, the subgrid or the local grid segment and a power drawn from the electric power grid, the subgrid or the local grid segment.

9. The method according to claim 8, comprising:
setting the grid rigidity as a quotient of the grid frequency change and a power balance change; and
adjusting at least one current limit of the upper reactive current limit, the lower active current limit, the upper active current limit, and the lower reactive current limit according to the grid rigidity.

10. The method according to claim 9, comprising:
classifying the electric power grid, the subgrid or the local grid segment as a soft or a rigid grid depending on the grid rigidity; and
adjusting the at least one current limit according to the classification.

11. The method according to claim 10, comprising:
specifying the at least one current limit according to a proportion of converter-controlled feeders in the electric power grid; and/or
determining the grid rigidity according to the proportion of converter-controlled feeders in the electric power grid.

12. The method according to claim 1, comprising:
selecting at least one current limit of the upper reactive current limit, the lower active current limit, the upper active current limit, and the lower reactive current limit depending on a local frequency softness at the grid connection point; and/or
setting an increase in the reactive current of a reactive current droop depending on the local frequency softness at the grid connection point, wherein:
the local frequency softness is detected at the grid connection point if a grid frequency at the grid connection point oscillates with a greater amplitude than at a reference point of the electric power grid, and
the local frequency softness is measured based on a ratio of an amplitude of oscillation of the grid frequency at the grid connection point to an amplitude of oscillation of the grid frequency at the reference point.

13. The method according to claim 1, comprising:
setting a reactive current droop or an increase in the reactive current of the reactive current droop according to a grid rigidity in the fault mode operation; and/or
setting the reactive current droop or the increase in the reactive current of the reactive current droop according to a proportion of converter-controlled feeders in the electric power grid in the fault mode operation.

14. The method according to claim 1, wherein,
determining a converter proportion as a proportion of converter-controlled feeders for the electric power grid or a grid segment of the electric power grid, wherein the converter proportion represents a ratio of currently fed-in active power from all converter-controlled feeders of the electric power grid or the grid segment to a total active power currently fed in the electric power grid or the grid segment, or a ratio of the active power capable of being fed in by all converter-controlled feeders of the electric power grid or the grid segment to the active power capable of being fed in by all converters of the electric power grid or the grid segment.

15. The method according to claim 14, wherein the converter proportion is a ratio of a sum of nominal power ratings of all the converter-controlled feeders of the electric power grid or the grid segment to a sum of nominal power ratings of all feeders of the electric power grid or the grid segment.

16. The method according to claim 14, comprising:
setting at least one current limit of the upper reactive current limit, the lower active current limit, the upper active current limit, and the lower reactive current limit only in response to the converter proportion exceeding a minimum converter proportion.

17. The method according to claim 16, wherein the minimum converter proportion is at least 50%.

18. A converter-controlled feeder that is a wind energy system and/or a battery for feeding electric power at a grid connection point into an electric power grid having a grid voltage, the converter-controlled feeder comprising:
an inverter or converter configured to feed the electric power into the electric power grid in a normal operating mode in which a grid fault or grid malfunction in the electric power grid has not been detected; and
an infeed controller configured to switch to fault mode operation in response to detecting the grid fault or grid malfunction in which the grid voltage increased or decreased, wherein the infeed controller is configured to:

in the normal operating mode:
- cause an active current to be fed in to feed active electric power into the electric power grid; and
- in response to detecting a current requirement, cause a reactive current to be used to additionally feed a reactive electric power into the electric power grid, wherein a combination of the active current and the reactive current results in an apparent current; and in the fault mode operation:
- cause an additional reactive current to be fed into the electric power grid or cause a magnitude of the reactive current to be increased to increase or decrease the grid voltage; and
- use a mode prioritizing reactive power or a mode prioritizing active power, wherein in the mode prioritizing reactive power, the active current is reduced such that the apparent current remains within an apparent current limit, and in the mode prioritizing active power, the reactive current is limited or reduced such that the apparent current remains within the apparent current limit, wherein:
in the mode prioritizing reactive power:
- an upper reactive current limit is set for the magnitude of the reactive current, and/or
- a lower active current limit is set for the active current, or in the mode prioritizing active power:
- an upper active current limit is set for the active current, and/or
- a magnitude for a lower reactive current limit is set for the reactive current.

* * * * *